United States Patent
Eriksson et al.

(10) Patent No.: US 10,158,450 B2
(45) Date of Patent: Dec. 18, 2018

(54) METHOD AND FIRST NODE FOR HANDLING A FEEDBACK PROCEDURE IN A RADIO COMMUNICATION

(71) Applicant: Telefonaktiebolaget LM Ericsson (publ), Stockholm (SE)

(72) Inventors: Erik Eriksson, Linköping (SE); Martin Hessler, Linköping (SE); Fredrik Lindqvist, Järfälla (SE); Osman Nuri Can Yilmaz, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 66 days.

(21) Appl. No.: 15/514,913

(22) PCT Filed: Sep. 29, 2014

(86) PCT No.: PCT/EP2014/070773
§ 371 (c)(1),
(2) Date: Mar. 28, 2017

(87) PCT Pub. No.: WO2016/050262
PCT Pub. Date: Apr. 7, 2016

(65) Prior Publication Data
US 2017/0237529 A1    Aug. 17, 2017

(51) Int. Cl.
*H04L 1/00* (2006.01)
*H04L 1/16* (2006.01)
(Continued)

(52) U.S. Cl.
CPC .......... *H04L 1/0018* (2013.01); *H04B 17/318* (2015.01); *H04B 17/336* (2015.01);
(Continued)

(58) Field of Classification Search
CPC .............................. H04L 1/0018; H04L 1/0021
See application file for complete search history.

(56) References Cited

U.S. PATENT DOCUMENTS

| 5,815,667 A * | 9/1998 | Chien ..................... H04L 47/10 370/229 |
| 7,177,274 B2 * | 2/2007 | Van Der Zee .......... H04L 47/10 370/230 |

(Continued)

FOREIGN PATENT DOCUMENTS

| WO | 02056544 A2 | 7/2002 |
| WO | 03045080 A1 | 5/2003 |

(Continued)

*Primary Examiner* — Joseph D Torres
(74) *Attorney, Agent, or Firm* — Patent Portfolio Builders, PLLC

(57) ABSTRACT

A method and a first node for handling a feedback procedure requiring transmission of feedback messages indicating either an acknowledgement, ACK, or a non-acknowledgement, NACK, of correct reception of data transmitted on a forward link in a radio communication with a second node in a radio network. The first node obtains a latency requirement of the radio communication corresponding to the time from transmission of the data until the data becomes outdated. The first node further applies a first transmission mode employing said feedback procedure when the latency requirement is above a latency threshold, and applies a second transmission mode omitting said feed back procedure when the latency requirement is below the latency threshold.

20 Claims, 4 Drawing Sheets

(51) Int. Cl.
  *H04L 1/18* (2006.01)
  *H04B 17/318* (2015.01)
  *H04B 17/336* (2015.01)
(52) U.S. Cl.
  CPC .......... *H04L 1/0009* (2013.01); *H04L 1/0021* (2013.01); *H04L 1/1685* (2013.01); *H04L 1/1809* (2013.01); *H04L 1/1825* (2013.01); *H04L 1/1867* (2013.01); *H04L 1/1877* (2013.01); *H04L 1/1887* (2013.01)

(56) References Cited

U.S. PATENT DOCUMENTS

| | | | | |
|---|---|---|---|---|
| 7,680,038 | B1 * | 3/2010 | Gourlay | H04L 41/0896 370/230 |
| 8,199,758 | B2 * | 6/2012 | Patwardhan | H04L 1/1848 370/394 |
| 8,699,383 | B2 * | 4/2014 | Katis | H04L 12/1831 370/260 |
| 9,344,218 | B1 * | 5/2016 | Liu | H04L 1/0045 |
| 10,015,776 | B2 * | 7/2018 | Hosseini | H04L 27/2601 |
| 2003/0112822 | A1 * | 6/2003 | Hong | H04L 12/6418 370/469 |
| 2003/0235202 | A1 * | 12/2003 | Van Der Zee | H04L 47/10 370/428 |
| 2006/0050666 | A1 | 3/2006 | Odenwalder | |
| 2007/0025264 | A1 * | 2/2007 | Cheng | H04L 47/14 370/252 |
| 2008/0002617 | A1 * | 1/2008 | Peisa | H04W 72/1231 370/329 |
| 2008/0123518 | A1 * | 5/2008 | Putzolu | H04L 1/1877 370/216 |
| 2008/0144626 | A1 | 6/2008 | Bertinelli et al. | |
| 2008/0209297 | A1 * | 8/2008 | Chandra | H04L 1/1838 714/748 |
| 2009/0006910 | A1 | 1/2009 | Hamzeh | |
| 2009/0103531 | A1 * | 4/2009 | Katis | H04L 12/1831 370/389 |
| 2009/0103689 | A1 * | 4/2009 | Katis | H04L 12/1831 379/88.13 |
| 2009/0104894 | A1 * | 4/2009 | Katis | H04L 12/581 455/413 |
| 2009/0168759 | A1 * | 7/2009 | Katis | H04L 12/1831 370/352 |
| 2009/0168760 | A1 * | 7/2009 | Katis | H04L 12/1831 370/352 |
| 2009/0207771 | A1 * | 8/2009 | Lindskog | H04L 12/1868 370/312 |
| 2009/0327352 | A1 * | 12/2009 | Thomas | G06Q 10/107 |
| 2010/0039938 | A1 * | 2/2010 | Sagfors | H04L 41/0896 370/238 |
| 2010/0162070 | A1 * | 6/2010 | Das | H04L 1/0018 714/751 |
| 2013/0301620 | A1 | 11/2013 | Göransson et al. | |
| 2014/0254351 | A1 | 9/2014 | Newman et al. | |

FOREIGN PATENT DOCUMENTS

| | | |
|---|---|---|
| WO | 2009120825 A1 | 10/2009 |
| WO | 2014139427 A1 | 9/2014 |

\* cited by examiner

METHOD AND FIRST NODE FOR HANDLING A FEEDBACK PROCEDURE IN A RADIO COMMUNICATION

TECHNICAL FIELD

The present disclosure relates generally to a method and a first node for handling a feedback procedure requiring transmission of feedback messages indicating either an acknowledgement, ACK, or a non-acknowledgement, NACK, of correct reception of data transmitted in a radio communication with a second node.

BACKGROUND

For some years, different types of radio networks for wireless communication have been developed to provide radio access for various wireless terminals in different areas. The radio networks are constantly improved to provide better coverage and capacity to meet the demands from subscribers using increasingly advanced services and terminals, e.g. smartphones and tablets, which may require considerable amounts of bandwidth and resources for data transport in the networks. A limiting factor for capacity of a radio network is the amount of available radio resources, e.g. in terms of time, frequency bandwidth and transmit power, and the capacity of a radio network is improved by more efficient usage of such radio resources.

In the field of mobile or wireless communication, the term "wireless device" is often used and will be used in this disclosure to represent any communication entity capable of radio communication with a radio network by sending and receiving radio signals, such as e.g. mobile telephones, tablets and laptop computers. Another common term in this field is "User Equipment, UE". A wireless device in this context could also be a machine-to-machine type of device operating automatically such as a sensor, counter or measuring entity which is configured to send reports over the radio network e.g. at certain intervals or upon certain events. Further, the term "network node", is used here to represent any node of a radio network that is arranged to communicate radio signals with wireless devices. The network node in this context is sometimes also referred to as a base station, radio node, e-NodeB, eNB, NB, base transceiver station, access point, etc.

It is becoming increasingly common to employ so-called "Machine-to-Machine", M2M, devices which are typically installed at certain locations to operate automatically by sending and receiving data according to a predefined behavior. For example, equipment and procedures have been developed for monitoring various locations, areas and functions that need to be supervised, where M2M devices can be installed at different locations within a monitored area to perform some predefined operational task such as measuring, counting, detecting or sensing, and typically reporting the result to a central server or the like. These devices may be configured to measure or observe some metric or parameter of interest, such as temperature, pressure, voltage, battery level, light, motion, sound, presence of objects, presence of smoke, to mention a few illustrative examples.

Some common examples of M2M device installations include public and private buildings, infrastructures, vehicles, industrial premises, machines, communication networks, and so forth. The devices often use radio access over a radio network to report sensor data comprising information about their measurements and observations to the server, e.g. at regular intervals or triggered by occurrence of an event, e.g. detection of motion, sound, vibration, light, smoke, temperature rise, and so forth. The server may further send various commands and instructions back to the devices to control their operation. This scenario can be employed for achieving "factory automation" or similar.

An example of an arrangement for monitoring a particular area is schematically illustrated in FIG. 1 where a plurality of M2M devices "D" are distributed at different locations within a schematically shown monitored area 100, the devices D being configured to perform various measurements and observations at their respective locations and to send reports over a radio network 102 to a central server 104, as indicated by arrows "R". The server 104 may also send various commands to control operation of the devices D, as indicated by opposite arrows "C".

As mentioned above, it is of interest for network operators to improve capacity in their networks by utilizing the available radio resources as efficiently as possible. Another area of interest is to ensure reliability when data is transmitted to or from the wireless devices, e.g. M2M devices, so that no errors occur in the information communicated, if this is deemed important. This can be achieved by adding extra control bits in the transmission which can be used for error correction and/or for checking that there is no error in the received data, e.g. after make an attempt at error correction. A common method for error detection is the well-known Cyclic Redundancy Check, CRC, where basically a sum of the transmitted data may be checked.

If a data receiving node determines, e.g. by using CRC or other error detecting method, that data has not been received correctly from a data sending node, it may send an error indicating message as feedback to the data sending node which then may send the same data once again to the data receiving node, referred to as retransmission. A commonly used process for enabling retransmissions of erroneously received data is the well-known Hybrid Automatic Repeat Request, HARQ, process. Retransmissions may be employed if it is important that the data is correct when received, such as in M2M reporting of measurements and observations. On the other hand, a certain amount of errors can normally be tolerated in speech or video data and retransmissions may in that case not be motivated. If an application is delay-sensitive, such as real-time speech and video, the process of feedback and retransmission may simply take too long.

The HARQ process or similar generally requires a node receiving data from another node to indicate whether a transmitted chunk of data has been properly received and decoded or not, by sending a feedback message to the data sending node. In this description, the term "forward link" refers to the link used for conveying data and the term "reverse link" refers to the link used for conveying feedback messages.

FIG. 2 illustrates a simple example of how a HARQ process or similar is basically performed. In a first action 2:1, a data sending node denoted data sender 200 transmits a piece of data on a forward link to a data receiving node denoted data receiver 202. The data sender 200 may be a network node and the data receiver 202 may be a wireless device, or vice versa, and this procedure may be applied in either direction. Having received the data, the data receiver 202 checks if the data has any errors, e.g. by using the above-mentioned CRC for error detection, in another action 2:2. The data receiver 202 then returns a feedback message accordingly on a reverse link to data sender 200, in a next action 2:3.

The feedback message is either an acknowledgement, ACK, which confirms correct reception of the data, or a non-acknowledgement, NACK, which indicates an error in the received data or no reception at all, depending on the outcome of action 2.2 When receiving a NACK, the data sender 200 is required to retransmit the same chunk of data, as indicated by an optional action 2:4, to enable another attempt of reception and decoding by the data receiver 202. The HARQ process is widely known as such in this field and it is not necessary to describe in any further detail to understand the following disclosure.

However, it is a problem that in some applications or services, transmitted data must be processed or otherwise used at the receiver node before the data has become obsolete or out-of-date after its transmission. If too much time has passed after the initial transmission, the data is no longer valid and therefore useless. In this respect there is no difference in performance between non-delivered data and too late delivered data. Data that has not been received and decoded in time may thus be considered as lost data. The applications or services may still be error-sensitive requiring that the error rate is kept below a maximum tolerated level.

For such error-sensitive applications or services, a low data error rate may still be achieved by using a relatively large amount of radio resources for the data transmission on the forward link, e.g. by employing added error correction bits and/or high transmit power, to ensure correct data reception even when the radio conditions are bad. To achieve this at all times, the radio resources for data must be dimensioned for a "worst-case scenario", which may require something like 10 times more radio resources than what is normally needed for about, say, 99% of the time. Therefore, large amounts of radio resources will often be occupied to no avail, which is also a problem.

SUMMARY

It is an object of embodiments described herein to address at least some of the problems and issues outlined above. It is possible to achieve this object and others by using a method and a first node as defined in the attached independent claims.

According to one aspect, a method is performed by a first node for handling a feedback procedure requiring transmission of feedback messages indicating either an acknowledgement, ACK, or a non-acknowledgement, NACK, of correct reception of data transmitted on a forward link in a radio communication with a second node in a radio network. The first node may be a network node serving a wireless device or a wireless device being served by a network node. In this method, the first node obtains a latency requirement of the radio communication corresponding to the time from transmission of the data until the data becomes outdated. The first node then applies a first transmission mode employing said feedback procedure when the latency requirement is above a certain latency threshold, and applies a second transmission mode omitting said feedback procedure when the latency requirement is below the latency threshold.

Thereby, the first node will apply the first transmission mode and the feedback procedure only if the data would not be outdated when a retransmission is made, since the feedback procedure is not worthwhile otherwise. The first node will thus apply the second transmission mode and omit the feedback procedure if the data would anyway be outdated when a retransmission is made such that the feedback procedure is not worthwhile. In this way, it can be avoided that radio resources are wasted to no avail.

According to another aspect, a first node is arranged to handle a feedback procedure requiring transmission of feedback messages indicating either an acknowledgement, ACK, or a non-acknowledgement, NACK, of correct reception of data transmitted on a forward link in a radio communication with a second node in a radio network. The first node comprises a processor and a memory, said memory comprising instructions executable by said processor, whereby the first node is operative to obtain a latency requirement of the radio communication corresponding to the time from transmission of the data until the data becomes outdated. The first node is also operative to apply a first transmission mode employing said feedback procedure when the latency requirement is above a latency threshold, and to apply a second transmission mode omitting said feedback procedure when the latency requirement is below the latency threshold.

In another aspect, the network node comprises an obtaining module configured to obtain a latency requirement of the radio communication corresponding to the time from transmission of the data until the data becomes outdated. The network node further comprises an applying module configured to apply a first transmission mode employing said feedback procedure when the latency requirement is above a latency threshold, and to apply a second transmission mode omitting said feedback procedure when the latency requirement is below the latency threshold.

The above method and first node may be configured and implemented according to different optional embodiments to accomplish further features and benefits, to be described below.

A computer program is also provided comprising instructions which, when executed on at least one processor, cause the at least one processor to carry out the above method. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
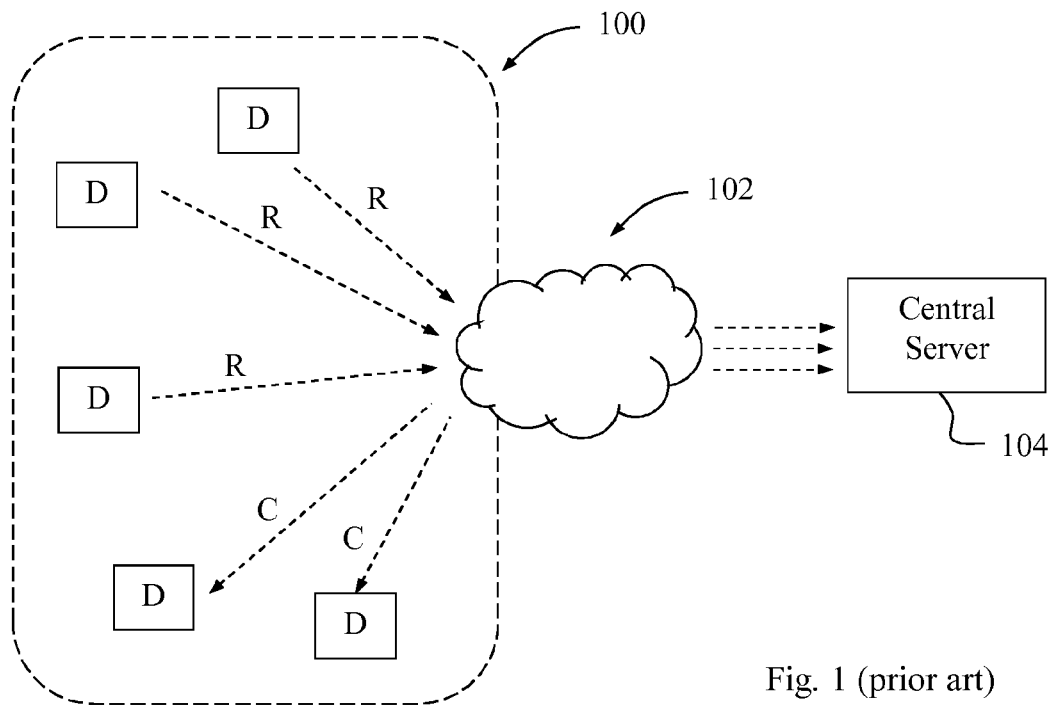
FIG. 1 is a communication scenario illustrating that wireless M2M devices communicate with a central server, according to the prior art.
Figure 2:
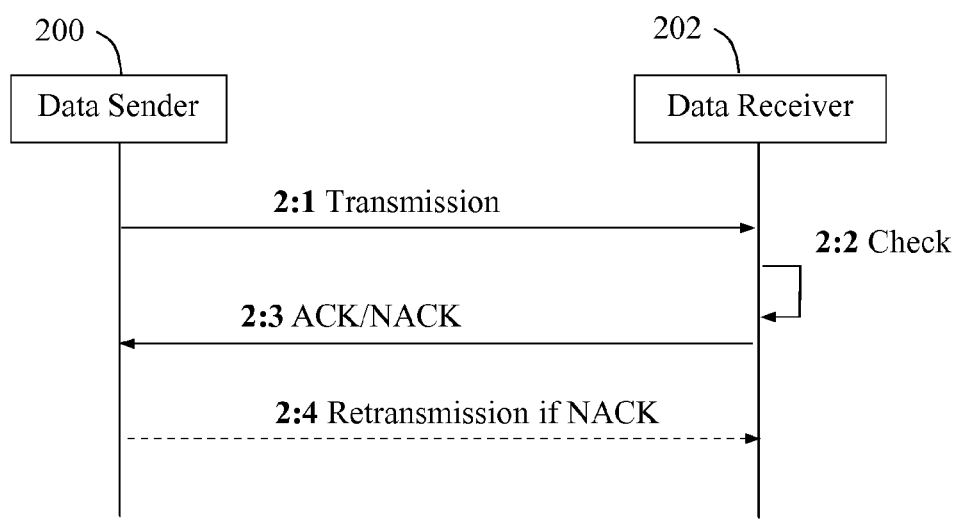
FIG. 2 is a signaling diagram illustrating a basic HARQ process, according to the prior art.

Briefly described, a solution is provided to ensure that data is conveyed in a radio communication between a first node and a second node without the data becoming obsolete or out-of-date before correct reception, particularly if the radio communication requires correct reception of the data before a certain "deadline" which will be referred to as a latency requirement. Embodiments are also provided to ensure that the data is conveyed with no higher error rate than the radio communication can tolerate. Throughout this description, the first node may be a network node and the second node may be a wireless device, or the first node may be a wireless device and in that case the second node may be a network node. The embodiments described herein refer to radio communication but they could also be applied for wireline communication of data where a feedback procedure can be applied in the manner described herein, such as in a Digital Subscriber Line, DSL, communication.

In this solution it has thus been recognized that a radio communication or other similar communication may have a certain latency requirement corresponding to the time from transmission of data until the data becomes outdated, i.e. obsolete, invalid or out-of-date. The latency requirement thus refers to a duration from transmission of data after which the data is considered to be of no use and thus lost, which can be seen as a "hard" deadline for delivery of the data. An example may be data transmitted from an M2M device comprising measurements of a parameter that fluctuates very rapidly and is used as a basis for dynamically controlling some function, e.g. in a machine or similar. A measurement value may in this case be considered obsolete and useless after, say, 10 ms (milliseconds) if the parameter is likely to change more or less significantly during this time.

If the first node finds that the latency requirement of a radio communication corresponds to a duration shorter than the time it takes between a transmission of data and a retransmission of the data according to the above-described feedback procedure, it is not sensible to employ the feedback procedure at all. This is because every time a NACK is indicated in a feedback message the retransmitted data will not be received in time, i.e. before deadline expires according to the latency requirement. Therefore, retransmissions are useless in this case and can never remedy incorrectly received data. On the other hand, if the latency requirement allows for at least one retransmission of data before that data becomes outdated, the first node will choose to employ the feedback procedure, e.g. in order to meet an error requirement in the radio communication.

It has further been recognized that considerable amounts of radio resources may be spent to no avail when a feedback procedure is employed, since a certain amount of extra radio resources must be allocated on the reverse link which may be of no use in case the radio conditions are good on the forward link and no retransmissions of data are needed. The feedback procedure still requires the data receiver to keep sending feedback messages to the data sender also when no errors occur in the radio communication, thus indicating an ACK virtually every time. Therefore, error probability on the forward link may also be used as a basis for deciding whether to apply the feedback procedure or not.

On the other hand, if no feedback procedure is employed, thus not requiring any extra radio resources on a reverse link, it is necessary to ensure that the error probability does not exceed an error limit as required in the radio communication.

This may be achieved by employing added error correction bits instead of the error detection bits otherwise used for the feedback procedure.

An example of how the solution may be employed will now be described with reference to the flow chart in FIG. 3 which illustrates a procedure with actions performed by a first node. The first node operates to handle a feedback procedure requiring transmission of feedback messages indicating either an acknowledgement, ACK, or a non-acknowledgement, NACK, of correct reception of data transmitted on a forward link in a radio communication with a second node in a radio network. In a possible embodiment, the feedback procedure may comprise a HARQ process. As mentioned above, the first node may be a network node and the second node may in that case be a wireless device, or the first node may be a wireless device and the second node may in that case be a network node, such that the solution and its embodiments described herein can be implemented in either a network node or in a wireless device.

A first action 300 illustrates that the first node obtains a latency requirement of the radio communication corresponding to the time from transmission of the data until the data becomes outdated. This may be obtained based on a type or characteristics of the data to be communicated and/or the type of service it belongs to. The latency requirement may further depend on the destination or source of the data. For example, a certain destination of the data such as a control server may have defined a latency requirement for data that is sent to the server. Another example may be that data coming from a certain source, such as an M2M device delivering time-critical measurements, should satisfy a predefined latency requirement, and so forth. In further examples, a control server may have defined a latency requirement for time-critical control messages that are sent to a wireless device such as an M2M device.

In a next action 302, the first node determines whether the obtained latency requirement is above a certain threshold value, here called a "latency threshold". If so, the first node applies a first transmission mode employing said feedback procedure, in an action 304. If the obtained latency requirement is not above the latency threshold, the first node applies a second transmission mode omitting said feedback procedure, in an action 306. The latency threshold may be set such that the feedback procedure is applied only when motivated but not otherwise, to achieve satisfactory performance and efficient utilization of radio resources in the data communication, which will be explained in further detail below. It should be understood that a certain amount of radio resources must be allocated for enabling the communication of feedback messages. Even though the indication of ACK or NACK as such requires only one bit, 1 or 0, for each feedback message, a considerable amount of overhead is needed apart from that bit to enable this process.

In a possible embodiment, the first node may set the latency threshold based on an expected time between an initial transmission of data and a retransmission of the data when the first transmission mode is applied, e.g. in response to receiving a NACK from the second node. For example, the time between an initial transmission and a retransmission may be estimated from characteristics of the forward link used for the data transmission which may include time of waiting for radio resources scheduled for the data and for the feedback message. The time between an initial transmission and a retransmission may be obtained by using testing signals as well. A certain processing time should also be added e.g. to cater for the time it takes for the data receiving node to make a decoding attempt and decide whether a NACK or ACK should be sent, and further the time it takes for the data sending node to process the feedback message and execute a retransmission. It should be noted that in a retransmission of data that has been transmitted before, it may not be exactly the same data or bits that is retransmitted.

For example, the same information bits may be transmitted but with different redundancy bits attached, depending on the implementation.

In this way, the first node will apply the first transmission mode and the feedback procedure only if the latency requirement exceeds the expected time between initial transmission and retransmission, since the feedback procedure is worthwhile only if the data is not outdated when a retransmission is made. On the other hand, the first node will apply the second transmission mode and omit the feedback procedure if the latency requirement is below the expected time between initial transmission and retransmission, which implies that the data would anyway be outdated before a retransmission is made such that the feedback procedure is not worthwhile and only a waste of radio resources.

In another possible embodiment, the first node may obtain an estimated error probability for the data and adjust the latency threshold to be above the latency requirement when the estimated error probability for the data is below an error target for the data. The estimated error probability for the data may also be referred to as an expected data error rate. An example of how this embodiment may be used will now be explained and described in more detail with reference to the flow chart in FIG. 4 which illustrates another procedure with actions performed by a first node in a radio communication with a second node.

A first action 400 illustrates that the first node sets the latency threshold based on an expected time between an initial transmission of data and a retransmission of the same data, e.g. according to the examples described above. Another action 402 illustrates that the first node obtains a latency requirement of the radio communication corresponding to the time from transmission of the data until the data becomes outdated, which basically corresponds to the above-described action 300.

The first node then determines whether an estimated error probability for the data is below a certain error target, in an action 404. In another possible embodiment, the first node may obtain the estimated error probability by signal measurements on the forward link comprising at least one of: signal-to-noise ratio, SNR, signal-to-interference-and-noise ratio, SINR, and signal strength. In this context, the commonly used terms SNR and SINR should be understood as the ratio between the received "wanted" signals as transmitted from the data sending node and any "unwanted" energy reception which may include noise as well as any interfering signals that happens to be received as well if present. In other words, the first node may thus estimate the error probability based on a measured SNR or SINR and/or based on a measured signal strength.

For example, an expected data error rate, i.e. the estimated error probability, may be determined if the SNR is known by using a so-called Q-function which is well-known in the art. In the field of statistics, the Q-function generally describes a tail probability of a standard normal (Gaussian) distribution. In this context of applying a Q-function for estimating the error probability for the data, the following Q-function may be employed:

$$Q\left(\frac{1}{2}\sqrt{\frac{Eb}{N0}}\right)$$

where Eb is received energy per bit and N0 is the noise power spectral density. The ratio Eb/N0 can thus be regarded as a useful measure or quantity of the SNR. Nonetheless, any other suitable way of estimating the error probability for the data may also be used and the solution is not limited in this respect.

The error target may have been set as the maximum data error rate that the radio communication can tolerate without requiring retransmissions of erroneously received data. In other words, the radio communication requires that the error rate in communicated data must not exceed the error target, which could alternatively be referred to as an error requirement or a maximum acceptable data error rate. Thus, if the estimated error probability for the data is below the error target, the error target can be met without retransmissions and it is therefore not necessary to use the feedback procedure. In this case, radio resources can be saved by employing the second transmission mode which omits the feedback procedure, even if the latency requirement allows for retransmissions, that is without the data becoming outdated when retransmitted. This may thus improve the spectral efficiency as the radio resources are typically very limited in a radio network.

Therefore, the first node adjusts the latency threshold, in an action 406, to be above the latency requirement when the estimated error probability for the data is below the error target for the data. Thereby, the second transmission mode will be selected since the latency requirement will not exceed the latency threshold in a next action 408 which corresponds to action 302 above.

In action 408, the first node thus determines whether the obtained latency requirement is above the latency threshold. If so, the first node applies a first transmission mode employing said feedback procedure, in an action 410. If not, the first node applies a second transmission mode omitting said feedback procedure, in an action 412. Actions 408-412 can be performed in the manner described above for actions 302-306 which will not be repeated here.

Further embodiments are possible to use in any of the above-described procedures for handling a feedback procedure by a first node, which will be outlined below. It was mentioned above that the data receiving node may use CRC or any other method for detecting whether there is an error or not in received data, which is used as a basis for sending a feedback message, ACK or NACK, to the data sending node. The data receiving node typically uses specific error detection bits that the data sending node has added to the data to enable the error detection at the data receiving node, which is a well-known technique per se not necessary to describe here in any detail. In a possible embodiment, the first node may determine an amount of error detection bits that should be added to the data before transmission in the first transmission mode so that a ratio between the amount of added error detection bits and the amount of bits in the data is below a preset limit, which could enhance the spectral efficiency by limiting the amount of overhead. For example, the error detection bits may be CRC bits. In another example, the feedback procedure may comprise a HARQ process.

Certain error sensitive applications may require that the data error rate does not exceed an error target. As an example, a 6 byte data message with an error requirement or target of $10^{-9}$ may, after a first transmission using 36 error detection bits, already achieve a data error rate$<10^{-6}$. In this case, the 36 error detection bits can be removed if the second transmission mode is used and a data error rate$<10^{-9}$ can be achieved if the 36 bits are used for data coding instead of error detection which inherently reduces the data error rate.

The error probability, i.e. the expected data error rate, may be estimated by using the above-described Q-function.

Figure 5:
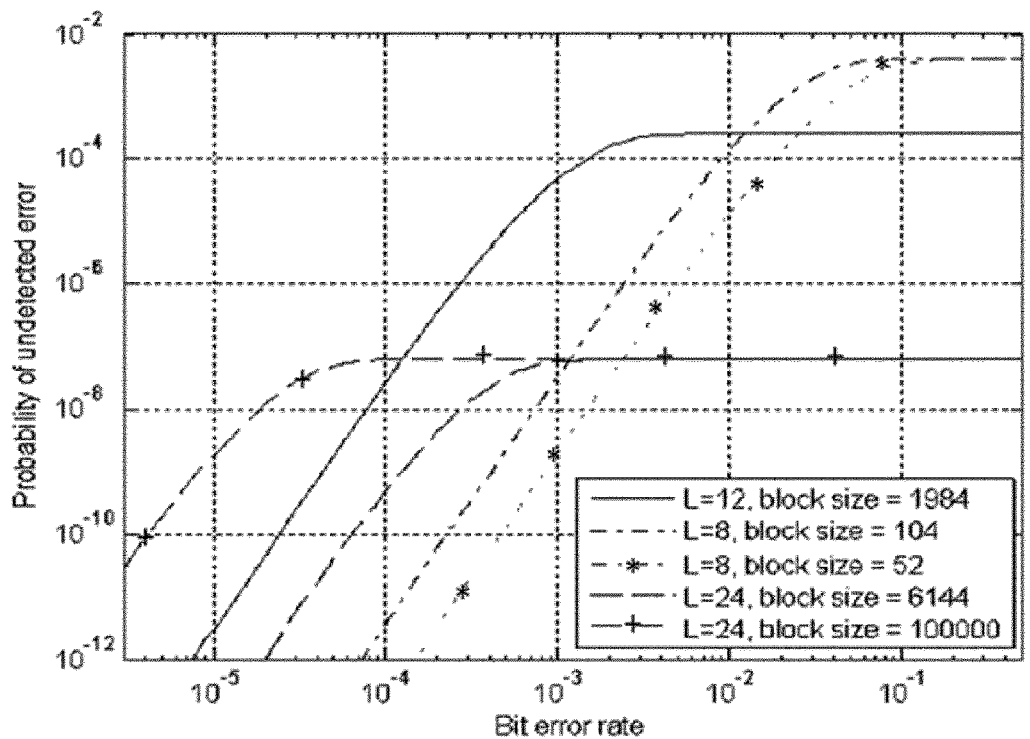
FIG. 5 is a diagram illustrating how error probability in a radio communication of data may be dependent on bit error rate for different CRC lengths.

It is also of interest to reduce the probability that data errors go undetected in a radio communication when the first transmission mode is applied, which may be done basically by increasing the number of CRC bits when transmitting the data. Error detection performance in Long Term Evolution, LTE, networks is illustrated in FIG. 5 which shows how the probability of undetected error is dependent on bit error rate for different CRC lengths, L, in bits and block sizes in bits. The block size thus indicates the amount of bits in the transmitted data. It can be seen that if the bit error rate increases, a low probability of undetected error can be achieved basically by using high L, e.g. L=24. On the other hand, when a low L=8 is used, the probability of undetected error is high for both block sizes of 52 and 104.

Figure 6:
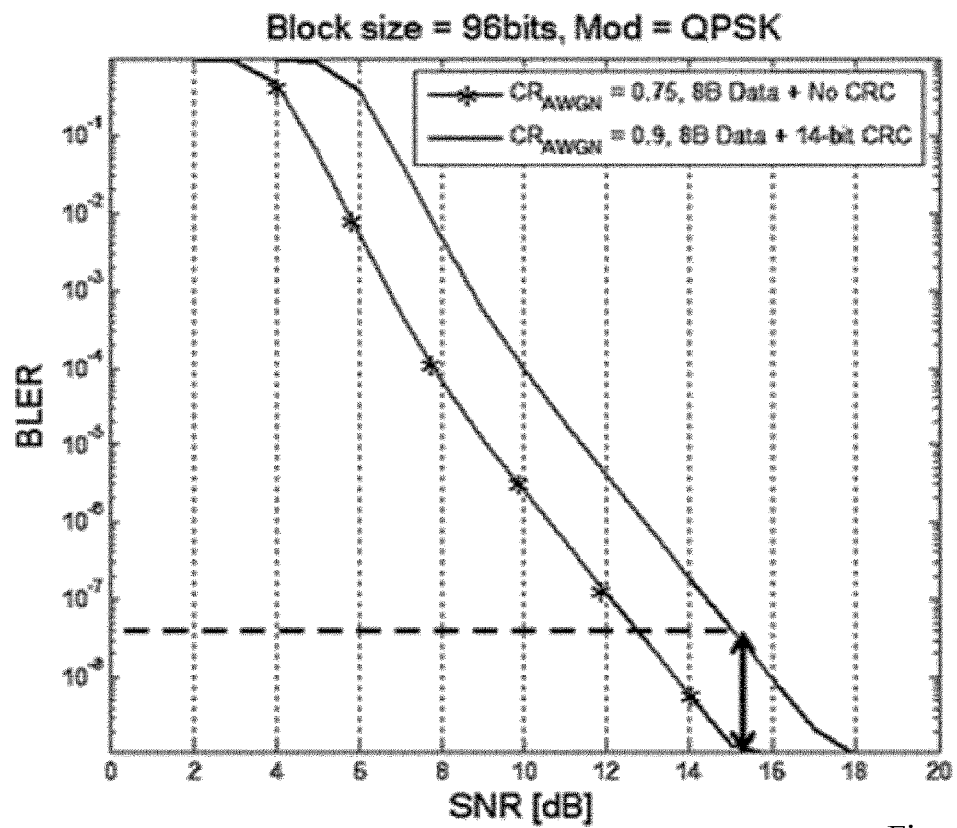
FIG. 6 is a diagram illustrating how block error rate, BLER, on a radio link may be dependent on signal over noise ratio for usage and non-usage of CRC, respectively.

FIG. 6 illustrates how the performance in terms of data error rate can be improved by means of error correction in an error sensitive communication with and without CRC where the total block size is 96 bits. This figure thus shows how a Block Error Rate, BLER, is dependent on SNR when 14-bit CRC is used, right curve, and when no CRC is used but more bits are available for coding and error correction, left curve. Thus, for a given SNR the BLER is lower when no CRC is used than when the 14-bit CRC is used.

In another possible embodiment, if multiple radio bearers are used in the radio communication, the first node may perform the above-described method of handling a feedback procedure individually for each radio bearer. In other words, the first node decides in this embodiment whether to apply the first transmission mode or the second transmission mode for each radio bearer separately, which has the advantage of adapting the transmission mode for best results individually instead of compromising by applying the same transmission mode for all radio bearers in the radio communication.

Having selected either the first or the second transmission mode, the first node needs to indicate the mode selection to the second node which may be done in different ways. In another possible embodiment, the first node may configure the applied first or second transmission mode semi-statically for the second node throughout the radio communication, e.g. using higher layer signaling. In an alternative possible embodiment, the first node may configure the applied first or second transmission mode dynamically to the second node.

For example if the first node is a network node, it may in another possible embodiment signal the applied first or second transmission mode dynamically to the second node either explicitly in a resource grant or implicitly coded in a transport block size signaling such that a signaled transport block size greater than a predefined size threshold implies the first transmission mode and a signaled transport block size smaller than the size threshold implies the second transmission mode. Thereby, no extra bits are required for this signaling and the second transmission mode can be easily signaled for radio communications with small transport block size below the size threshold, while the first transmission mode can be signaled for radio communications with larger transport block size above the size threshold.

Figure 7:
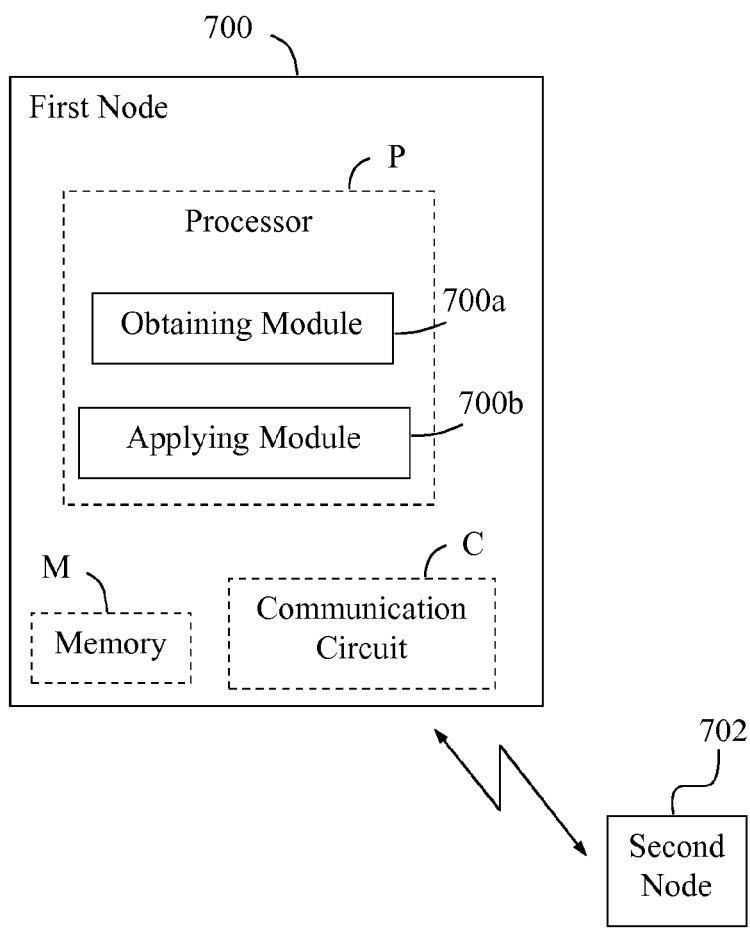
FIG. 7 is a block diagram illustrating a first node in more detail, according to further possible embodiments.

The block diagram in FIG. 7 illustrates a detailed but non-limiting example of how a first node 700 may be structured to bring about the above-described solution and embodiments thereof. In this figure, the first node 700 may thus be configured to operate according to any of the examples and embodiments of employing the solution as described above, where appropriate, and as follows. The first node 700 is shown to comprise a processor "P", a memory "M" and a communication circuit "C" with suitable equipment for transmitting and receiving signals with data and messages in the manner described herein.

The communication circuit C in the first node 700 thus comprises equipment configured for communication with a second node 702 over a radio interface using a suitable protocol for radio communication depending on implementation. As in the examples discussed above, the first node 700 described herein may be a network node or a wireless device. The first node 700 comprises means configured or arranged to perform at least some of the actions 300-306 and 400-412 of the flow charts in FIGS. 3 and 4, respectively, in the manner described above. These actions may be performed by means of functional modules in the processor P in the first node 700 as follows.

The first node 700 is arranged to handle a feedback procedure requiring transmission of feedback messages indicating either an acknowledgement, ACK, or a non-acknowledgement, NACK, of correct reception of data transmitted on a forward link in a radio communication with the second node 702 in a radio network.

The first node 700 thus comprises a processor P and a memory M, said memory comprising instructions executable by said processor, whereby:

The first node 700 is operative to obtain a latency requirement of the radio communication corresponding to the time from transmission of the data until the data becomes outdated. This obtaining activity may be performed by an obtaining module 700a in the first node 700, e.g. in the manner described for action 300 above.

The first node 700 is also operative to apply a first transmission mode employing said feedback procedure when the latency requirement is above a latency threshold, and to apply a second transmission mode omitting said feedback procedure when the latency requirement is not above the latency threshold. These applying activities may be performed by an applying module 700b in the first node 700, e.g. in the manner described for actions 302-306 above.

It should be noted that FIG. 7 illustrates some possible functional modules in the network node 700 and the skilled person is able to implement these functional modules in practice using suitable software and hardware. Thus, the solution is generally not limited to the shown structures of the network node 700, and the functional modules 700a-c may be configured to operate according to any of the features described in this disclosure, where appropriate.

Figure 3:
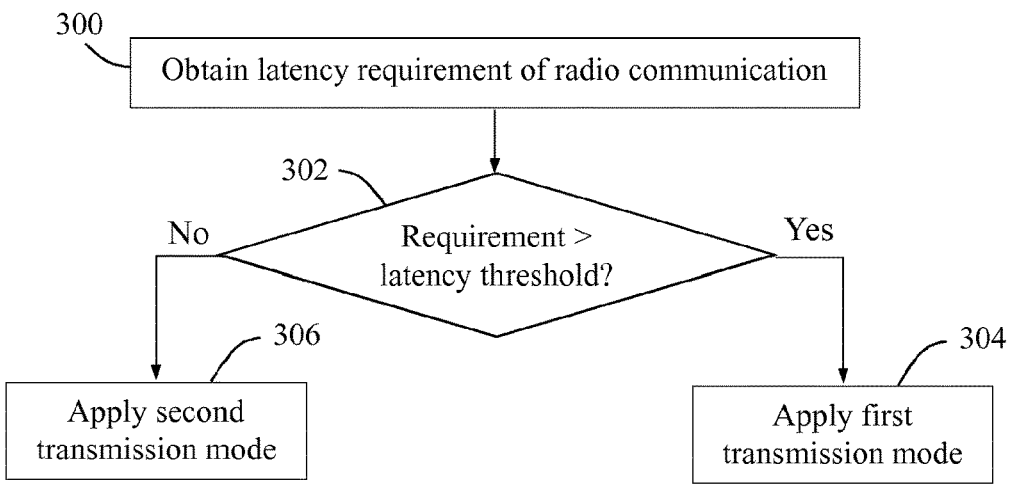
FIG. 3 is a flow chart illustrating a procedure in a first node, according to some possible embodiments.
Figure 4:
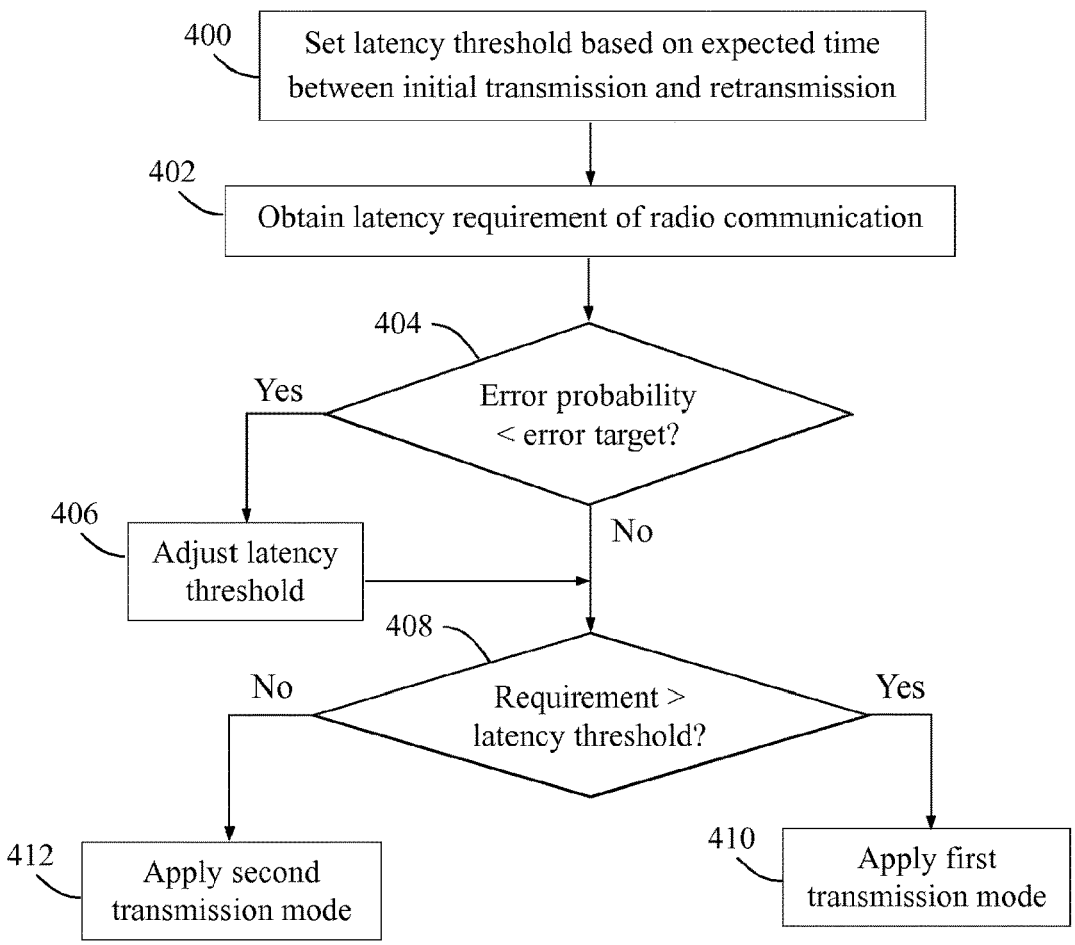
FIG. 4 is another flow chart illustrating a more detailed example of a procedure when the solution is used, according to further possible embodiments.

The embodiments and features described herein may thus be implemented in a computer program comprising instructions which, when executed on at least one processor, cause the at least one processor to carry out the above actions e.g. as described for any of FIGS. 3 and 4. Further, the above-described embodiments may be implemented in a carrier containing the above computer program, wherein the carrier is one of an electronic signal, optical signal, radio signal, or computer readable storage medium. The computer readable storage medium may be a compact disc or other carrier suitable for holding the computer program. Some examples of how the computer program and the carrier can be realized in practice are outlined below, and with further reference to FIG. 7.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the network node 700.

While the solution has been described with reference to specific exemplifying embodiments, the description is generally only intended to illustrate the inventive concept and should not be taken as limiting the scope of the solution. For example, the terms "first node", "second node", "feedback procedure", "latency requirement", "latency threshold", "error probability" and "error detection bits" have been used throughout this disclosure, although any other corresponding entities, functions, and/or parameters could also be used having the features and characteristics described here. The solution is defined by the appended claims.

The invention claimed is:

1. A method performed by a first node, for handling a feedback procedure requiring transmission of feedback messages indicating either an acknowledgement (ACK) or a non-acknowledgement (NACK) of correct reception of data transmitted on a forward link in a radio communication with a second node in a radio network, the method comprising:
obtaining a latency requirement of the radio communication corresponding to the time from transmission of the data until the data becomes outdated;
applying a first transmission mode employing said feedback procedure when the latency requirement is above a latency threshold; and
applying a second transmission mode omitting said feedback procedure when the latency requirement is not above the latency threshold,
wherein the first node obtains an estimated error probability for the data and adjusts the latency threshold to be above the latency requirement when the estimated error probability for the data is below an error target for the data.

2. The method according to claim 1, wherein the first node sets the latency threshold based on an expected time between an initial transmission of the data and a retransmission of the data when the first transmission mode is applied.

3. The method according to claim 1, wherein the first node obtains the estimated error probability by signal measurements on the forward link comprising at least one of: signal-to-noise ratio (SNR), signal-to-interference-and-noise ratio (SINR), and signal strength.

4. The method according to claim 1, wherein the first node determines an amount of error detection bits that should be added to the data before transmission in the first transmission mode so that a ratio between the amount of added error detection bits and the amount of bits in the data is below a preset limit.

5. The method according to claim 4, wherein the error detection bits are Cyclic Redundancy Check (CRC) bits.

6. The method according to claim 1, wherein multiple radio bearers are used in the radio communication and the first node performs the method individually for each radio bearer.

7. The method according to claim 1, wherein the feedback procedure comprises a Hybrid Automatic Repeat Request (HARQ) process.

8. The method according to claim 1, wherein the first node configures the applied first or second transmission mode semi-statically for the second node throughout the radio communication.

9. The method according to claim 1, wherein the first node configures the applied first or second transmission mode dynamically to the second node.

10. The method according to claim 9, wherein the first node signals the applied first or second transmission mode to the second node either explicitly in a resource grant or implicitly coded in a transport block size signaling such that a signaled transport block size greater than a size threshold implies the first transmission mode and a signaled transport block size smaller than the size threshold implies the second transmission mode.

11. A first node arranged to handle a feedback procedure requiring transmission of feedback messages indicating either an acknowledgement (ACK) or a non-acknowledgement (NACK) of correct reception of data transmitted on a forward link in a radio communication with a second node in a radio network, the first node comprising:
a processor; and
a memory, said memory storing instructions executable by said processor, whereby the first node is operative to:
obtain a latency requirement of the radio communication corresponding to the time from transmission of the data until the data becomes outdated;
apply a first transmission mode employing said feedback procedure when the latency requirement is above a latency threshold;
apply a second transmission mode omitting said feedback procedure when the latency requirement is not above the latency threshold; and
obtain an estimated error probability for the data and adjust the latency threshold to be above the latency requirement when the estimated error probability for the data is below an error target for the data.

12. The first node according to claim 11, wherein the memory further stores instructions whereby the first node is operative to set the latency threshold based on an expected time between an initial transmission of the data and a retransmission of the data when the first transmission mode is applied.

13. The first node according to claim 11, wherein the memory further stores instructions whereby the first node is operative to obtain the estimated error probability by signal measurements on the forward link comprising at least one of: a signal-to-noise ratio (SNR), signal-to-interference-and-noise ratio (SINR), and signal strength.

14. The first node according to claim 11, wherein the memory further stores instructions whereby the first node is operative to determine an amount of error detection bits that should be added to the data before transmission in the first transmission mode so that a ratio between the amount of added error detection bits and the amount of bits in the data is below a preset limit.

15. The first node according to claim 14, wherein the error detection bits are Cyclic Redundancy Check (CRC) bits.

16. The first node according to claim 11, wherein multiple radio bearers are used in the radio communication and the memory further stores instructions whereby the first node is operative to perform the method individually for each radio bearer.

17. The first node according to claim 11, wherein the feedback procedure comprises a Hybrid Automatic Repeat Request (HARQ) process.

18. The first node according to claim 11, wherein the memory further stores instructions whereby the first node is operative to configure the applied first or second transmission mode semi-statically for the second node throughout the radio communication.

19. The first node according to claim 11, wherein the memory stores instructions whereby the first node is operative to configure the applied first or second transmission mode dynamically to the second node.

20. The first node according to claim 19, wherein the memory further stores instructions whereby the first node is operative to signal the applied first or second transmission mode to the second node either explicitly in a resource grant or implicitly coded in a transport block size signaling such that a signaled transport block size greater than a size threshold implies the first transmission mode and a signaled transport block size smaller than the size threshold implies the second transmission mode.

* * * * *